United States
Shoemaker

[11] 3,868,175
[45] Feb. 25, 1975

[54] FORTY POWER MICROSCOPE OBJECTIVE

[75] Inventor: Arthur H. Shoemaker, East Aurora, N.Y.

[73] Assignee: American Optical Corporation, Southbridge, Mass.

[22] Filed: July 9, 1973

[21] Appl. No.: 377,870

[52] U.S. Cl............ 350/225, 350/175 ML, 350/229
[51] Int. Cl. ............................................... G02b 9/12
[58] Field of Search............. 350/175 ML, 225, 229

[56] References Cited
UNITED STATES PATENTS

| | | | |
|---|---|---|---|
| 2,713,808 | 7/1955 | Klein | 350/175 ML |
| 3,552,830 | 1/1971 | Shoemaker | 350/225 X |
| 3,552,831 | 1/1971 | Shoemaker | 350/225 X |

*Primary Examiner*—Paul A. Sacher
*Attorney, Agent, or Firm*—Alan H. Spencer; William C. Nealon; H. R. Berkenstock, Jr.

[57] ABSTRACT

A three component microscope objective having a numerical aperture of substantially 0.66 and a magnification of substantially 40X is provided by a three element system. The microscope objective provides correction for the usual chromatic image aberrations as well as spherical aberration, coma, and astigmatism while having a substantially flat image field.

2 Claims, 1 Drawing Figure

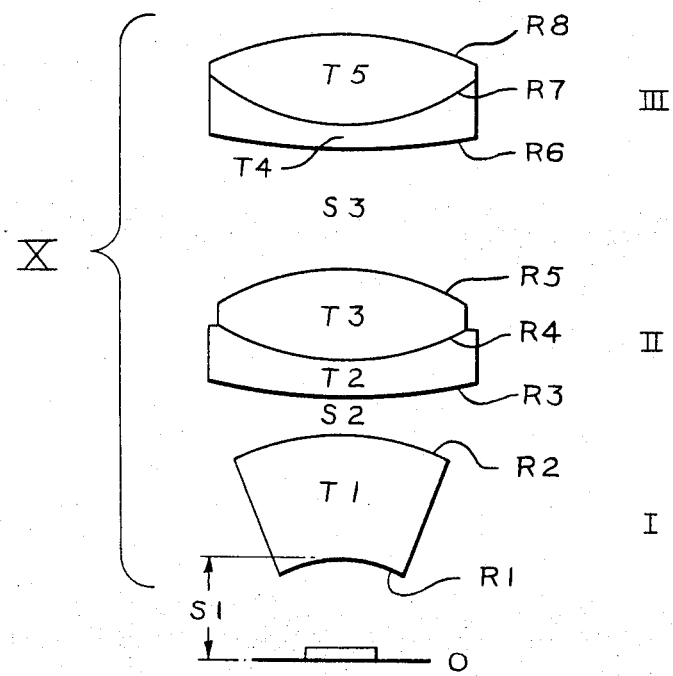

FORTY POWER MICROSCOPE OBJECTIVE

THE INVENTION

This invention relates to improvements in a microscope objective, and in particular, to a microscope objective with a numerical aperture of substantially 0.66 and a magnification of substantially 40×. It is the object of this invention to provide such a microscope objective which is well corrected for the usual chromatic image aberrations as well as spherical aberration, coma, and astigmatism, while having a substantially flat image field when used with a telescope objective as described in U.S. Pat. 3,355,234 and a typical 10X eyepiece.

THE DRAWING

The drawing is an optical diagram of a microscope objective according to the present invention.

FIG. 1 is an optical diagram of the preferred form of the present invention wherein the numeral X designates the objective in general, and numerals I, II, and III designate the three optically aligned components of said objective. The foremost component, component I is a concavo-convex positive lens followed by components II and III which are both double convex positive doublets.

The lens parameters are as follows: The successive radii are designated R1-R8, where a minus sign indicates radii on centers of curvature lying on the object side of their vertices. The axial thicknesses of successive lenses are designated T1-T5. The refractive indices of the glasses in successive lens element are designated ND1-ND5 and the Abbe Numbers of the successive glasses are designated $\nu 1$-$\nu 5$. The index of refraction and Abbe Numbers are absolute values.

|   |   | Radius R | Thickness T | Space S | Refractive Index ND | Abbe Number $\nu$ |
|---|---|---|---|---|---|---|
|   |   |   |   | $S_1$=.1566F |   |   |
| I | $R_1$= | −.6155F | $T_1$=.7637F |   | $ND_1$=1.69669 | $\nu_1$=56.13 |
|   | $R_2$= | −.6604F |   |   |   |   |
|   |   |   |   | $S_2$=.0467F |   |   |
|   | $R_3$= | 4.3553F | $T_2$=.3273F |   | $ND_2$=1.78446 | $\nu_2$=25.75 |
| II | $R_4$= | 1.2850F |   |   |   |   |
|   |   |   | $T_3$=.6546F |   | $ND_3$=1.69669 | $\nu_3$=56.13 |
|   | $R_5$= | −1.7914F |   |   |   |   |
|   |   |   |   | $S_3$=1.2152F |   |   |
|   | $R_6$= | 9.2148F |   |   |   |   |
| III | $R_7$= | 1.3725F | $T_4$=.3273F |   | $ND_4$=1.78161 | $\nu_4$=37.08 |
|   |   |   | $T_5$=.6546F |   | $ND_5$=1.50129 | $\nu_5$=56.39 |
|   | $R_8$= | −3.3821F |   |   |   |   |

A preferred embodiment of the invention having a focal length F equal to 4.583 is set forth in the following table.

|   |   | Radius R | Thickness T | Space S | Refractive Index ND | Abbe Number $\nu$ |
|---|---|---|---|---|---|---|
|   |   |   |   | $S_1$= .718 |   |   |
| I | $R_1$= | −2.821 | $T_1$=3.500 |   | $ND_1$=1.69669 | $\nu_1$=56.13 |
|   | $R_2$= | −3.026 |   |   |   |   |
|   |   |   |   | $S_2$= .214 |   |   |
|   | $R_3$= | 19.960 | $T_2$=1.500 |   | $ND_2$=1.78446 | $\nu_2$=25.75 |
| II | $R_4$= | 5.889 |   |   |   |   |
|   |   |   | $T_3$=3.000 |   | $ND_3$=1.69669 | $\nu_3$=56.13 |
|   | $R_5$= | −8.210 |   |   |   |   |
|   |   |   |   | $S_3$=5.569 |   |   |
|   | $R_6$= | 42.231 |   |   |   |   |
| III | $R_7$= | 6.290 | $T_4$=1.500 |   | $ND_4$=1.78161 | $\nu_4$=37.08 |
|   |   |   | $T_5$=3.000 |   | $ND_5$=1.50129 | $\nu_5$=56.39 |
|   | $R_8$= | −15.500 |   |   |   |   |

It will be apparent that the foregoing is variable depending on the value of F. Other forms are thus possible and changes may be made in the values of the constructional data based on the relationships with the above charts, without departing from the spirit of this invention.

nesses (T), axial spaces along lens element and object plane (S), refractive indices (ND), and Abbe Numbers ($\nu$), are determined by the following relationship:

|   | | Radius R | Thickness T | Space S | Refractive Index ND | Abbe Number $\nu$ |
|---|---|---|---|---|---|---|
| I | $R_1=$ | $-.6155F$ | | $S_1=.1566F$ | $ND_1=1.69669$ | $\nu_1=56.13$ |
| | $R_2=$ | $-.6604F$ | $T_1=.7637F$ | | | |
| II | $R_3=$ | $4.3553F$ | | $S_2=.0467F$ | $ND_2=1.78446$ | $\nu_2=25.75$ |
| | $R_4=$ | $1.2850F$ | $T_2=.3273F$ | | | |
| | $R_5=$ | $-1.7914F$ | $T_3=.6546F$ | | $ND_3=1.69669$ | $\nu_3=56.13$ |
| III | $R_6=$ | $9.2148F$ | | $S_3=1.2152F$ | | |
| | $R_7=$ | $1.3725F$ | $T_4=.3273F$ | | $ND_4=1.78161$ | $\nu_4=37.08$ |
| | $R_8=$ | $-3.3821F$ | $T_5=.6546F$ | | $ND_5=1.50129$ | $\nu_5=56.39$ |

What is claimed is:

1. A three component microscope objective comprising a positive concavo-convex lens as the first component (I), a double convex positive doublet (II) as the second component and a double convex positive doublet (III) as the third component having a magnification of 40× and a numerical aperture of approximately 0.66 wherein the parameters of radii (R), lens thicknesses (T), axial spaces along lens element and object plane (S), refractive indices (ND), and Abbe Numbers ($\nu$), are determined by the following relationship:

wherein scalar values are given in millimeters.

2. The microscope objective of claim 1 wherein the parameters of radii (R), lens thickness (T), axial spaces along lens element and object plane (S), refractive indices (ND), and Abbe Numbers ($\nu$), being determined by the following relationship

|   | | Radius R | Thickness T | Space S | Refractive Index ND | Abbe Number $\nu$ |
|---|---|---|---|---|---|---|
| I | $R_1=$ | $-2.821$ | | $S_1=.718$ | $ND_1=1.69669$ | $\nu_1=56.13$ |
| | $R_2=$ | $-3.026$ | $T_1=3.500$ | | | |
| II | $R_3=$ | $19.960$ | | $S_2=.214$ | $ND_2=1.78446$ | $\nu_2=25.75$ |
| | $R_4=$ | $5.889$ | $T_2=1.500$ | | | |
| | $R_5=$ | $-8.210$ | $T_3=3.000$ | | $ND_3=1.69669$ | $\nu_3=56.13$ |
| III | $R_6=$ | $42.231$ | | $S_3=5.569$ | | |
| | $R_7=$ | $6.290$ | $T_4=1.500$ | | $ND_4=1.78161$ | $\nu_4=37.08$ |
| | $R_8=$ | $-15.500$ | $T_5=3.000$ | | $ND_5=1.50129$ | $\nu_5=56.39$ | wherein scalar values are given in millimeters.

* * * * *